Patented Jan. 14, 1941

2,228,753

UNITED STATES PATENT OFFICE 2,228,753

INTERMEDIATES FOR INDIGOID DYESTUFFS

John Elton Cole and Benjamin Franklin Skiles, Wilmington, Del., assignors to E. I. du Pont de Nemours & Company, Wilmington, Del., a corporation of Delaware No Drawing. Application December 7, 1938, Serial No. 244,354

5 Claims. (Cl. 260—330)

This invention relates to the preparation of organic compounds suitable particularly for the manufacture of indigoid colors; more specifically, it relates to the preparation of new compounds of the following general formula:

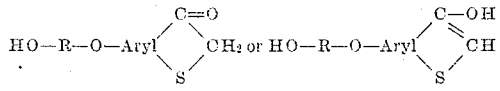

wherein Aryl represents an aryl radical of the benzene or naphthalene series, while R stands for an alkylene radical, a hydroxy alkylene radical, or a chain of such radicals joined together by oxygen in the form of ethers.

It is an object of this invention to provide novel intermediate compounds for dyestuffs, especially for dyestuffs of the indigoid series. It is a further object of this invention to provide practical processes for the synthesis of such intermediates. Other and further important objects of this invention will appear as the description proceeds.

The compounds of this invention may be named generically nuclear hydroxy-alkoxy-ethers of the 3-hydroxythionaphthenes. We have found that these compounds constitute particularly valuable intermediates for the manufacture of indigoid dyes. The latter may be formed either by oxidation of the given intermediates, to form symmetrical thioindigoes, or by condensation the above intermediates with other intermediates which are capable of condensing with 3-hydroxy-thionaphthenes generally to give indigoid colors. The remarkable value of these intermediates lies in the fact that the resulting indigoid colors possess unusual penetrating, fastness and levelness qualities when employed as a printing color for artificial cellulosic textile fabric, as more fully described and claimed in our copending application of even date herewith, Ser. No. 244,353.

Now according to our present invention, we prepare the above novel intermediates by either one of two principal methods.

I. We may start with an ortho-amino-aryl-thioglycollic-acid-lactam having in its aryl nucleus a hydroxy-alkoxy substituent of the form HO—R—O— as above defined. This compound is then subjected to a series of successive reactions, which is by itself well known, and which is generally employed for conversion of an ortho-amino-aryl-thioglycollic-lactam into the corresponding 3-hydroxy-thionaphthene. (See Lubs and Cole, U. S. Patent No. 2,000,033.)

The general procedure according to this synthesis is indicated by the following empirical equations:

o-Amino-aryl-thioglycollic-acid-lactam; alkaline-hydrolysis→alkali-metal salt of o-amino-aryl-thioglycollic acid; diazotize and Sandmeyer with sodium-cuprous cyanide→o-cyano-aryl-thioglycollic-acid-sodium salt; alkaline hydrolysis→3-amino-2-carboxy-thionaphthene-sodium salt; acid hydrolysis→3-hydroxy-thionaphthene.

II. We may start with a finished 3-hydroxy-thionaphthene which has a further hydroxy group in the aryl nucleus, and subject this to an alkylating procedure by the aid of an alkylene oxide, such as ethylene-oxide or 1,2-cyclohexene-oxide.

A still further procedure possible is to form the 3-acetyl derivative of the intermediate compound desired by refluxing a 2-carboxy-aryl-1-thioglycollic acid carrying the desired hydroxy-alkoxy substituent in the desired position in the aryl nucleus, with acetic anhydride and anhydrous sodium acetate. The resulting 3-acetyl derivative may then be hydrolyzed with alkali to the desired hydroxy-alkoxy-3-hydroxy-thionaphthene.

Without limiting our invention to any particular procedure, the following examples are given to illustrate our preferred mode of operation. Parts mentioned are by weight.

EXAMPLE 1.—*Lactam process—Ethanoloxy derivatives*

4.5 parts of 5-ethanoloxy-2-amino-phenyl-thioglycol-lactam were slowly added to 4 parts of a 25% sodium hydroxide solution at 100° C. and heated at 100° C. until entirely hydrolyzed. The solution was diluted with 10 parts of water; 1.5 parts of sodium nitrite were added and the mass was cooled to 5° C. This solution was slowly added with stirring to 4.5 parts of sulfuric acid and 60 parts of cracked ice. After stirring for 30 minutes, the solution was made neutral to litmus with $Na_2CO_3$, the temperature being held at 5° C. A sodium-cuprous-cyanide solution was then added with good agitation. The sodium-cuprous-cyanide solution was made by heating together 6.6 parts of $CuSO_4.5H_2O$ and 4.4 parts of sodium cyanide in 20% aqueous solution.

After the last addition, the solution was slowly heated to 65° C. and held at this temperature for 1 hour. Then 6 parts of sodium hydroxide were added and the mass was heated at 90° C. for 1½ hours. The mass was salted out with 10 parts of common salt at 5° C., and the alkaline hydrolysis product was removed by filtration and washed with 15 parts of a 20% salt solution.

This product was then dissolved in 70 parts of water containing 0.1 part of 30% caustic, filtered, and five parts of sulfuric acid were added. It was heated at 70° C. for 1 hour, cooled to 20° C., and the 6-ethanoloxy-3-hydroxy-thionaphthene which formed was removed by filtration and purified by dissolving it in dilute caustic and precipitating with hydrochloric acid. It is a white solid melting at 106° C. It is insoluble in water, but soluble in alkali and organic solvents. Its probable formula is:

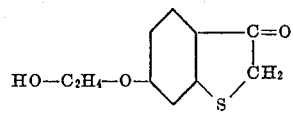

If in lieu of the lactam of 5-ethanoloxy-2-amino-phenyl-thioglycollic acid in the above example that of 5,6-dichloro-3-ethanoloxy-2-amino-phenyl-thioglycollic acid is employed, one obtains as the final product 6,7-dichloro-4-ethanoloxy-3-hydroxy-thionaphthene. The lactam of 3,6-dimethyl-5-ethanoloxy-2-amino-phenyl-thioglycollic acid gives, likewise, 4,7-dimethyl-6-ethanoloxy-3-hydroxy-thionaphthene.

EXAMPLE 2.—*Alkylation process*

One part of ethylene oxide, 2.5 parts of 3,6-dihydroxy-thionaphthene (Ber. 49, 955) and 25 parts of benzene were heated at 170° C. for 10 hours. The solution was decanted from the insoluble by-products and the benzene was steam distilled out of the solution. The oily tar which remained as the still residue was extracted with dilute caustic. On acidification of the alkaline solution, a precipitate of 3-hydroxy-6-ethanoloxy-thionaphthene was formed. Its properties and probable formula are the same as those of the product prepared according to Example 1.

If the proportion of ethylene oxide in this example is increased, polymers containing 2 or more moles of ethylene oxide condensed with 3,6-dihydroxythionaphthene are formed. These products are mixtures of substances having as their probable general formula:

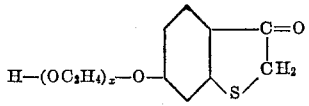

in which $x$ is an interger greater than 1, say from 2 to 5.

Similar results may also be obtained by using in lieu of ethylene oxide in the above example a different alkylene oxide, for instance 1,2-cyclohexene oxide, propylene oxide or glycide.

If in lieu of 3.6-dihydroxy-thionaphthene one starts in this example with 3,5-dihydroxy-thionaphthene, the corresponding 5-hydroxy-ethoxy or hydroxy-polyalkyleneoxy derivative of 3-hydroxy-thionaphthene will be obtained. In like manner, 7-chloro-4-hydroxy-2,1-naphthoxy-thiophene gives 7-chloro-4-hydroxyethoxy-2,1-naphthoxy-thiophene:

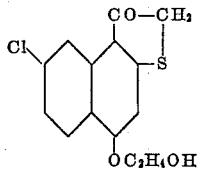

EXAMPLE 3.—*Hydroxy-propyloxy derivative*

Eight parts of a 25% caustic soda solution were heated to 95° C., and 9 parts of 5-(beta-hydroxy propyloxy)-2-amino-phenyl-thioglycol-lactam were slowly added, the mixture being held at this temperature until solution was complete. This solution was diluted with 20 parts of water, and, after 3 parts of sodium nitrite were added, was cooled to 10° C. and slowly added with stirring to 9 parts of sulfuric acid and 120 parts of cracked ice. After stirring for 30 minutes the solution was made neutral to litmus with soda ash, the temperature being held at 5° C. A sodium-cuprous-cyanide solution made by heating together 13.3 parts of CuSO4.5H2O and 8.8 parts of sodium cyanide in 20% aqueous solution, was then added with good agitation. After this addition, the solution was heated at 65° C. for 1 hour, cooled to 20° C., acidified with hydrochloric acid and filtered. The press-cake was extracted with a dilute soda ash solution and the product was precipitated on acidifying with hydrochloric acid.

2 parts of the 5-(beta-hydroxy-propyloxy)-2-cyano-phenyl-thioglycollic acid thus obtained were dissolved in 20 parts of water and 1 part of sodium hydroxide, and heated at 90 to 95° C. for 1 hour. Four parts of salt were added, and the solution was cooled to 0° C. and filtered. The filter cake was dissolved in 50 parts of water, and 3 parts of sulfuric acid were added. After heating at 60 to 65° C. for 1 hour, the solution was cooled to 20° C. and the 6-(beta-hydroxy-propyloxy)-3-hydroxy-thionaphthene thus obtained was removed by filtration. It is a white solid, insoluble in water, but soluble in dilute alkali and inorganic solvents. Its probable formula is:

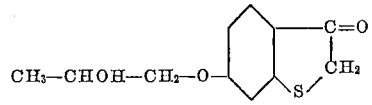

EXAMPLE 4.—*Hydroxy-isobutyloxy derivatives*

Five parts of 5-(beta-hydroxy-beta-methyl-propyloxy)-2-amino-phenyl-thioglycol-lactam were added to 5 parts of a 25% caustic solution and hydrolyzed at 100° C. for 6 hours. The solution formed was diluted with 10 parts of water; 1.5 parts of sodium nitrite were added and the mass was cooled to 5° C. It was then slowly added with stirring to 5 parts of sulfuric acid and 60 parts of cracked ice. After stirring for 30 minutes, the solution was made neutral to litmus with soda ash, the temperature being held at 5° C., and a sodium-cuprous-cyanide solution, prepared as before described using 6.6 parts of CuSO4.5H2O, was added with good agitation. The temperature was slowly raised to 65° C., held there an hour, after which the solution was cooled to 20° C., acidified and filtered. The cake was extracted with a dilute soda ash solution from which the 5-(beta-hydroxy-beta-methyl-propyloxy)-2-cyano-phenyl-thioglycollic acid was precipitated on acidification with hydrochloric acid.

Two parts of the above obtained compound were dissolved in 20 parts of water and 1 part of sodium hydroxide, and heated at 95° C. for 1 hour. Four parts of salt were added, and the solution was cooled to 0° C. and filtered. The filter cake was dissolved in 50 parts of water, and 3 parts of sulfuric acid were added. After heating at 60 to 65° C. for 1 hour, the solution was cooled to 20° C. and the 6-(beta-hydroxybeta-methyl-propyloxy)-3-hydroxy-thio-naphthene was filtered off. It was purified by dissolving in dilute sodium-hydroxide solution and precipitating with hydrochloric acid. It is a white solid, insoluble in water, but soluble in dilute alkali and in organic solvents. Its probable formula is:

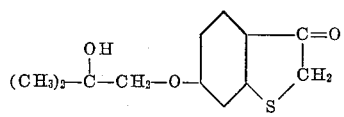

EXAMPLE 5.—*Dihydroxy propyloxy derivative*

45 parts of 5-(beta-gamma-dihydroxy-propyloxy)-2-amino-phenyl-thioglycol-lactam was heated with 150 parts of 25% sodium hydroxide solution for 3½ hours at 95° C. The solution was then diluted with 200 parts of water, and, after 13 parts of sodium nitrite were added, was cooled to 5° C. and added slowly with stirring to 150 parts of sulfuric acid and 1,000 parts of cracked ice. After stirring for 30 minutes the solution was made neutral to litmus using soda ash and holding the temperature at about 5° C. A sodium-cuprous-cyanide solution, prepared as before described using 66 parts of CuSO$_4$.5H$_2$O, was added with good agitation. After this addition, the solution was heated to 65° C. for 1 hour, cooled to 20° C., acidified with hydrochloric acid and filtered. The press-cake was extracted with a dilute soda ash solution from which the 5-(beta-gamma-dihydroxy-propyloxy)-2-cyano-phenyl-thioglycollic acid was precipitated on acidifying with hydrochloric acid.

One part of the last named organic compound was dissolved in 12 parts of 5% sodium hydroxide solution, and heated at 90° C. for 1 hour. 2.5 parts of salt were added, and the solution was cooled to 0° C. and filtered. The cake was dissolved in 20 parts of water, one part of sulfuric acid was added, and the mixture was heated at 65° C. for 1 hour. It was then cooled to 10° C. and the 6-(beta-gamma-dihydroxypropyloxy-3-hydroxy-thionaphthene thus obtained was removed by filtration. It has as its probable formula:

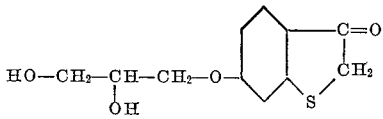

As an example of the third synthesis above mentioned, may be mentioned the preparation of the 3-acetyl derivative of 5,6-benzo-7-ethanoloxy-thionaphthene by refluxing a mixture of 1-ethanoloxy naphthalene-2-thioglycollic-acid-3-carboxylic acid, anhydrous sodium acetate and acetic anhydride.

In actual use for the synthesis of indigoid dyestuffs, the novel compounds often require to be converted into their anil form. This may be accomplished following standard procedure, as illustrated more fully by the following additional example.

EXAMPLE 6.—*Conversion into anil*

Twenty-one parts of 6-ethanoloxy-3-hydroxy-thionaphthene were dissolved in 600 parts of 3% sodium hydroxide solution warmed to 50° C., and a suspension of 15 parts of p-nitroso-dimethyl aniline in 150 parts of alcohol was added to it. After stirring for one hour at 50° C. the p-dimethtylamino anil of 6-ethanoloxy-3-hydroxy-thionaphthene was filtered off as a red solid, and washed with water. Analysis: S—9.40%, N—7.46%. Theory for C$_{18}$H$_{18}$O$_3$SN$_2$: S—9.36%, N—8.20%.

In like manner, the p-dimethylamino anils of the other hydroxyalkyl ethers and polyalkeneoxide ethers of dihydroxy-thionaphthtenes, mentioned in this specification, can be prepared.

The initial lactams employed in Examples 1, 3, 4 and 5 above are in themselves new compounds. They have been prepared by us from the respective hydroxy-2-amino-thiophenols by condensing first with chloro-acetic acid to give the corresponding hydroxy-o-amino-aryl-thioglycollic acid, which is readily lactamized by treatment with dilute HCl solution. The lactam was then subjected to alkylation by the aid of a chlorhydrin, such as ethylene-chlorhydrin, 1,2-propylene-chlorhydrin, isobutylene-chlorhydrin or glyceryl-chlorhydrin. They may also be prepared by starting with an aniline compound already having the desired hydroxy-alkoxy substituent in the nucleus, and converting this aniline compound into the lactam by the aid of sulfur monochloride and chloroacetic acid in the usual manner. The following additional examples illustrate these procedures:

EXAMPLE 7.—*Preparation of the initial lactam*

Five parts of 5-hydroxy-2-amino-thiophenol (Lubs & Cole, U. S. P. 1,954,707) were added to 150 parts of water and enough caustic soda was added to render the solution strongly alkaline to phenolphthalein but not alkaline to Clayton Yellow. The solution was then cooled to 10° C., and a sodium chloroacetate solution, prepared from 3.2 parts of caustic soda, 16 parts of cracked ice and 7 parts of chloracetic acid, was added. The mass was then slowly warmed to 60° C., and enough hydrochloric acid was added to render the solution strongly acid to Congo-Red paper. On boiling this solution, the 5-hydroxy-2-amino-phenyl-thioglycol lactam separated out as a light yellow solid melting at 239° C. Analysis: S—18.0%, N—7.55%; theory: S—17.68%, N—7.74%.

5.4 parts of 5-hydroxy-2-amino-phenyl-thioglycol-lactam as above obtained, were made into a solution with 3 parts of 30% sodium hydroxide, 5.3 parts of 40% ethylene chlorohydrine, and 30 parts of water; this solution was then stirred and heated at 100° C. for 3 hours. One part of 30% sodium hydroxide and 1.3 parts of a 40% ethylene chlorohydrine solution were then added, and the mass was again refluxed for 3 hours. Enough caustic was now added to give a strongly alkaline reaction to Clayton Yellow, and the mixture was cooled to 10° C. The 5-ethanoloxy-2-amino-phenyl-thioglycol lactam thus obtained was filtered off and washed alkali free. It is a white solid melting at 185° C. Analysis: found, S—14.2%; theory: S—14.2%.

EXAMPLE 8.—*Preparation of the lactam.—Alternative process*

Ten parts of 5-hydroxy-2-amino-phenyl-thioglycol lactam, 40 parts of benzene, one part of piperidine and 4 parts of ethylene oxide were heated in an autoclave at 170° C. for 10 hours. Removal of the benzene by distillation left the crude 5-ethanoloxy-2-amino-phenyl-thioglycol lactam as a grey solid which was purified by washing it with a warm dilute caustic soda solution, and crystallizing it from benzene.

EXAMPLE 9.—*5-ethanoloxy-2-amino-phenylthioglycol lactam*

Thirty parts of para-ethanoloxy-aniline hydrochloride and 200 parts of sulfur monochloride were heated at 75° C. for 3 hours, then cooled to 60° C., diluted with 100 parts of benzene, further heated at 60° C. for ½ hour, cooled to 15° C., filtered, and washed with benzene. The product was pasted with 80 parts of alcohol and added slowly to a solution prepared from 190 parts of alcohol, 180 parts of ice, 194 parts of a 30% caustic solution, 32 parts of chloracetic acid, and 2 parts of sodium hydrosulfite. This mixture was slowly warmed to 70° C. and held at this temperature for one hour. The alcohol was then distilled off and the residual mass was made acid to Congo-red paper with hydrochloric acid, and heated to 100° C. precipitating the 5-ethanoloxy-2-amino-phenyl-thioglycol lactam along with a small amount of its mono-chloro derivative. It may be purified by crystallizing it from benzene.

It will be clear from the above examples that our invention is of a general nature and may be applied to the synthesis of many other hydroxy-alkoxy-thionaphthenes of the above general formula, wherein the aryl nucleus may be a benzene or naphthalene radical and may carry the customary auxochromic substituents, such as lower alkyl, lower alkoxy and halogen.

It will be further understood that the details of procedure hereinabove set forth may be varied widely within the skill of those engaged in this art.

We claim:
1. A nuclear hydroxy-alkoxy ether of a 3-hydroxy thionaphthene.
2. A compound of the general formula

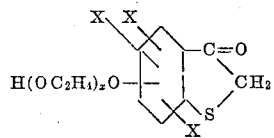

and its tautomeric form, wherein the X's represent substituents selected from the group consisting of hydrogen and mono-valent auxochromic substituents, while $x$ represents an integer not greater than 5.

3. A nuclear ethanoloxy derivative of 3-hydroxy-thionaphthene.
4. The compound 6-beta-ethanoloxy-3-hydroxy-thionaphthene.
5. A compound of the general formula

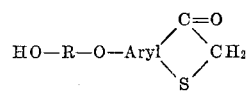

and its tautomeric form, wherein aryl designates an aryl nucleus having not over 10 carbon atoms in its cyclic structure, while R represents a radical selected from the group consisting of alkylene, hydroxy-alkylene and chains of such radicals joined together by oxygen atoms in the form of ethers.

JOHN ELTON COLE.
BENJAMIN FRANKLIN SKILES.

CERTIFICATE OF CORRECTION.

Patent No. 2,228,753. January 14, 1941.

JOHN ELTON COLE, ET AL.

It is hereby certified that error appears in the printed specification of the above numbered patent requiring correction as follows: Page 2, second column, line 45, for the word "derivatives" read --derivative--; page 3, second column, lines 64 and 65, strike out "Preparation of the lactam.—Alternative process" and insert instead --Alternative method of alkylation--; page 4, first column, lines 1 and 2, for "5-ethanoloxy-2-amino-phenylthioglycol lactam" read --Preparation of the lactam.—Alternative process--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.